(12) United States Patent
Cao et al.

(10) Patent No.: US 8,427,332 B2
(45) Date of Patent: Apr. 23, 2013

(54) ENERGY-SAVING REMINDER CIRCUIT FOR COMPUTER

(75) Inventors: Xiang Cao, Shenzhen (CN); Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 145 days.

(21) Appl. No.: 13/104,017

(22) Filed: May 10, 2011

(65) Prior Publication Data

US 2012/0268287 A1    Oct. 25, 2012

(30) Foreign Application Priority Data

Apr. 21, 2011    (CN) .......................... 2011 1 0100684

(51) Int. Cl.
    *G08B 21/00*    (2006.01)
(52) U.S. Cl.
    USPC ....... 340/657; 340/660; 340/679; 340/815.45

(58) Field of Classification Search .................... 340/657
    See application file for complete search history.

(56) References Cited

U.S. PATENT DOCUMENTS

| 5,657,257 | A * | 8/1997 | Lee ............................. 713/321 |
| 7,928,776 | B2 * | 4/2011 | Wang et al. .................. 327/143 |
| 2007/0096936 | A1 * | 5/2007 | You et al. ................ 340/815.45 |

* cited by examiner

*Primary Examiner* — Kerri McNally
(74) *Attorney, Agent, or Firm* — Altis Law Group, Inc.

(57) ABSTRACT

A circuit where a rotary push switch module with first and second switches are closed and first and second terminals of a NAND gate receive high level signals. An output terminal of the NAND gate outputs a low level signal. A light emitting diode (LED) is not lit. A voltage output terminal outputs a standby voltage. When the first switch is opened, and the second switch is closed, the first and the second input terminals of the NAND gate respectively receive a high level signal and a low level signal. The output terminal of the NAND gate outputs a high level signal. The LED is lit. The voltage output terminal does not output the standby voltage.

4 Claims, 1 Drawing Sheet

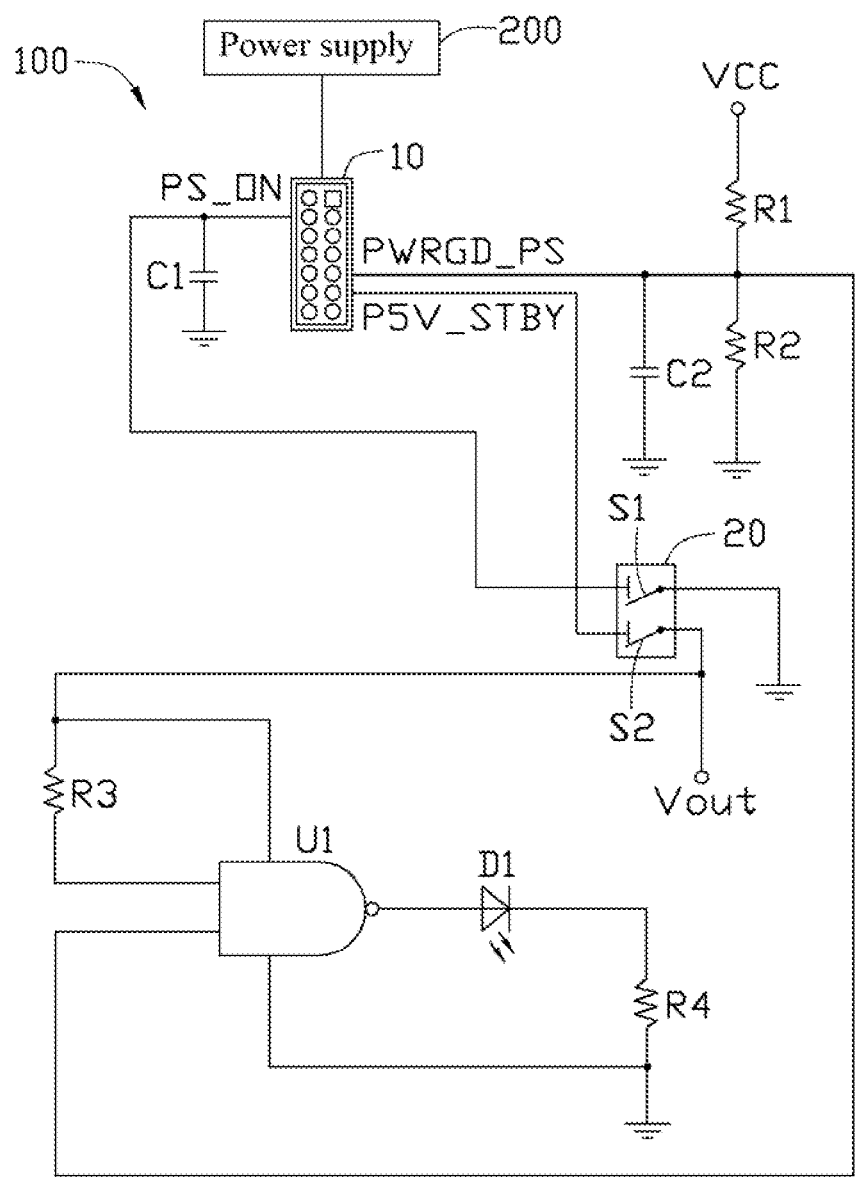

ENERGY-SAVING REMINDER CIRCUIT FOR COMPUTER

BACKGROUND

1. Technical Field

The present disclosure relates to reminder circuits, and particularly to a energy-saving reminder circuit to remind users to shut off a standby voltage after a computer is powered off.

2. Description of Related Art

In a personal computer (PC) system, power management is adopted to conserve energy. While the PC is powered, it can be put in a sleep mode to save energy when not in use. System power states derived from the advanced configuration and power interface (ACPI) specification are defined as follows:

S0/Working—The central processing unit (CPU) is fully up and operating; devices are powering up and down as needed.

S1—The CPU is stopped; the random access memory (RAM) is refreshed; the system is operating in a low power mode.

S2—The CPU has no power; the RAM is refreshed; the system is in a lower power mode than S1.

S3—The CPU has no power; the RAM is in slow refresh; the power supply is generally in a reduced power mode (for example, the power supply not supplying much power and is operating in a lower power efficiency mode).

S4—The hardware is completely off; the system memory has been saved to disk.

S5/Off—the hardware is completely off; the operating system has shut down; nothing has been saved.

When the computer is powered off and in the S5/off state, there is still a +5 volt standby voltage (+5VSB) applied to the motherboard for driving a basic power source control circuit of the computer system during the off state. However, this means the computer still consumes energy in the off state, which is a waste of energy.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawings, like reference numerals designate corresponding parts throughout the several views.

The drawing is a circuit diagram of a energy-saving reminder circuit for a computer in accordance with an exemplary embodiment of the present disclosure.

DETAILED DESCRIPTION

The disclosure, including the drawing, is illustrated by way of examples and not by limitation. It should be noted that references to "an" or "one" embodiment in this disclosure are not necessarily to the same embodiment, and such references mean at least one.

Referring to the drawing, a energy-saving reminder circuit 100 for a computer (not shown) in accordance with an exemplary embodiment includes a connector 10, capacitors C1 and C2, resistors R1-R4, a light emitting diode (LED) D1, a NAND gate U1, a voltage output terminal Vout, and a rotary push switch 20. In one embodiment, the rotary push switch 20 and the LED D1 are set on a front panel of the computer. The computer is powered on through the rotary push switch 20. The rotary push switch 20 includes two switches S1 and S2. The switch S1 is a push switch, and the switch S2 is a rotary switch around the switch S1. When powering on the computer, the second switch S2 is rotated to a power-on position, and the first switch S1 is pushed. When powering off the computer, the first switch S1 is pushed.

A power-on pin PS_ON of the connector 10 is connected to an end of the switch S1. Another end of the switch S1 is grounded. The capacitor C1 is connected between the power-on pin PS_ON of the connector 10 and ground. A voltage pin P5V_STBY of the connector 10 is connected to an end of the switch S2. Another end of the switch S2 is connected to the voltage output terminal Vout, connected to a voltage terminal of the NAND gate U1, and connected to a first input terminal of the NAND gate U1 through the resistor R3. A signal pin PWRGD_PS of the connector 10 is connected to a second input terminal of the NAND gate U1. The capacitor C2 is connected between the signal pin PWRGD_PS of the connector 10 and ground. The resistor R1 is connected between the signal pin PWRGD_PS of the connector 10 and a power source VCC. The resistor R2 is connected between the signal pin PWRGD_PS and ground. An output terminal of the NAND gate U1 is connected to an anode of the LED D1. A cathode of the LED D1 is grounded through the resistor R4. A ground terminal of the NAND gate U1 is grounded.

In use, the connector 10 is connected to a power supply 200 of the computer. When the switch S2 is rotated to the power-on position (namely the switch S2 is closed) and the rotary push switch 20 is pushed (namely the switch S1 is closed), the power supply 200 receives a low level signal from the power-on pin PS_ON of the connector 10 to power on the computer. The power supply 200 outputs a high level power-good signal through the signal pin PWRGD_PS of the connector 10 and outputs a 5V standby voltage through the voltage pin P5V_STBY of the connector 10. The 5V standby voltage and the high level power-good signal are provided to the first and the second input terminals of the NAND gate U1. The output terminal of the NAND gate U1 outputs a low level signal. The LED D1 is not lit, to indicate the computer is in a work state. The voltage output terminal Vout outputs the 5V standby voltage.

When the rotary push switch 20 is pushed again, the switch S1 is opened, and the switch S2 is still closed. The power supply 200 does not receive a power-on signal from the power on pin PS_ON of the connector 10 and is powered off, and then the computer is powered off. The second input terminal of the NAND gate U1 receives a low level power-good signal. Because the power supply still outputs a 5V standby voltage after the computer is powered off, the first input terminal of the NAND gate U1 receives the 5V standby voltage. The output terminal of the NAND gate U1 outputs a high level signal. The LED D1 is lit, to indicate the computer is in power state S5/Off, to remind users to shut off the 5V standby voltage by using the switch S2. Therefore, the 5V standby voltage is not output from the voltage output terminal Vout.

The energy-saving reminder circuit 100 can remind users with the LED D1 to shut off the 5V standby voltage by using the rotary push switch 20 when the computer is powered off and in the S5/off state, to save energy.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A energy-saving reminder circuit for a power supply, the energy-saving reminder circuit comprising:
   a connector connected to the power supply, and comprising a signal pin, a power-on pin, and a voltage pin;
   a light emitting diode (LED) comprising an anode, and a cathode being grounded;
   a NAND gate comprising a first input terminal, a second input terminal connected to the signal pin of the connector, a voltage terminal, and an output terminal connected to the anode of the LED;
   a voltage output terminal; and
   a push switch comprising a first switch and a second switch, wherein a first end of the first switch is connected to the power-on pin of the connector, and a second end of the first switch is grounded, a first end of the second switch is connected to the voltage pin of the connector, and a second end of the second switch is connected to the voltage output terminal, the voltage terminal of the NAND gate, and the first input terminal of the NAND gate;
   when the first and the second switches are closed, the first and the second terminals of the NAND gate receive high level signals, the output terminal of the NAND gate outputs a low level signal, the LED is not lit, the voltage output terminal outputs a standby voltage, when the first switch is opened, and the second switch is closed, the first input terminal of the NAND gate receives a high level signal, and the second input terminal of the NAND gate receives a low level signal, the output terminal of the NAND gate outputs a high level signal, the LED is lit, the voltage output terminal does not output the standby voltage.

2. The energy-saving reminder circuit of claim 1, wherein the push switch is a rotary push switch, the first switch is a push switch, and the second switch is a rotary switch, the first switch is opened or closed when the first switch is pushed, the second switch is closed or opened when the second switch is rotated to a power-on position or a power-off position.

3. The energy-saving reminder circuit of claim 1, further comprising first and second capacitors, wherein the first capacitor is connected between the power-on pin of the connector and ground, the second capacitor is connected between the signal pin of the connector and ground.

4. The energy-saving reminder circuit of claim 1, further comprising first to fourth resistors, wherein the first resistor is connected between the signal pin of the connector and a power source, the second resistor is connected between the signal pin and ground, the third resistor is connected between the second end of the second switch and the first input terminal of the NAND gate, the fourth resistor is connected between the output terminal of the NAND gate and ground.

* * * * *